United States Patent [19]

Steenborg

[11] Patent Number: 5,485,721
[45] Date of Patent: Jan. 23, 1996

[54] ARCJET FOR A SPACE FLYING BODY

[75] Inventor: Manfred Steenborg, Ritterhude, Germany

[73] Assignee: ERNO Raumfahrttechnik GmbH, Bremen, Germany

[21] Appl. No.: 268,807

[22] Filed: Jun. 30, 1994

[30] Foreign Application Priority Data

Jun. 30, 1993 [DE] Germany .......................... 43 21 725.7

[51] Int. Cl.⁶ ........................................................ F03H 1/00
[52] U.S. Cl. ........................................ 60/203.1; 60/39.462
[58] Field of Search ................................ 60/39.462, 200.1, 60/202, 203.1

[56] References Cited

U.S. PATENT DOCUMENTS

| | | | |
|---|---|---|---|
| 3,079,755 | 3/1963 | Forney | 60/39.462 |
| 3,303,651 | 2/1967 | Grant et al. | 60/39.462 |
| 3,304,719 | 2/1967 | Ducati | 60/203.1 |
| 3,618,324 | 11/1971 | Munding | 60/39.462 |
| 3,759,734 | 9/1973 | Mendelsohn et al. | |
| 4,805,400 | 2/1989 | Knowles | 60/203.1 |

FOREIGN PATENT DOCUMENTS 3931733  4/1991  Germany .

OTHER PUBLICATIONS

"Cathode Erosion Tests for 30 KW Arc Jets" by W. D. Deininger et al. published Jul. 1989 paper A/AA 89–2264 at Joint Propulsion Conference, Monterey Calif.

Primary Examiner—Louis J. Casaregola
Attorney, Agent, or Firm—W. G. Fasse; W. F. Fasse

[57] ABSTRACT

A thermal arcjet propulsion plant is particularly constructed for position and orbit corrections in a space flying body or spacecraft. A housing forms an anode and an expansion nozzle. An elongated rod mounted in an electrically insulating manner centrally in the housing forms the cathode which reaches with its tip into a plenum chamber just upstream of the nozzle. Propellant components formed by dissociating ammonia are injected into the plenum chamber. A small gap is provided between the tip of the cathode and the restrictor of the nozzle. An arc is ignited in this gap and the thermal arc energy is taken up by the by propellant. A dissociation chamber for the by propellant is arranged around the housing. The arrangement is such that the chamber in which the gas dissociation takes place is arranged in series with and upstream of the plenum chamber. The cathode is also arranged in series with the restrictor and the nozzle. The cathode is connected through a flexible electrical conductor to an electric power supply. Similarly, the housing forming the anode is connected to the same power supply. The dissociation chamber includes a catalyst for a catalytic and/or thermal dissociation of the ammonia into its components of hydrogen and nitrogen.

5 Claims, 3 Drawing Sheets

5,485,721

ARCJET FOR A SPACE FLYING BODY

FIELD OF THE INVENTION

The invention relates to a arcjet for a space flight body, missile, or the like. An arcjet forms the power source in such a plant.

BACKGROUND INFORMATION

Arcjet propulsion plants have an anode and a cathode. The anode forms part of a housing that also forms an expansion nozzle. The cathode is arranged and electrically insulated inside the housing. An electric discharge or arc is generated between the cathode and anode while flowing a propellant through the space between the tip of the cathode and the anode. The electrically insulated cathode reaches into a first recess of the housing functioning as a plenum chamber. The cathode tip is spaced by a small air gap upstream of the restrictor or expansion nozzle. The plenum is injected into the combustion chamber.

Such arcjets are also referred to as thermal arcjets. An article entitled "Cathode Erosion Tests for 30 kW Arcjets" by W. D. Deininger, A. Chopra and K. D. Goodfellow, was published in July 1989 as paper A/AA 89-2264 at the Joint Propulsion Conference of the A/AA/ASME/SAE/AS in Monterey, Calif., Jul. 10 to 12, 1989. A thermal propulsion plant is also disclosed in German Patent Publication DE 3,931,733 A1 or in U.S. Pat. No. 3,759,734. The propellant used in such arcjets is normally either ammonia ($NH_3$) or a gas mixture produced by thermal and/or catalytic decomposition of hydrazin ($N_2H_4$), whereby the mixture includes ammonia, nitrogen ($N_2$) and hydrogen ($H_2$). The propellant which has a temperature within the range of 500° to 600° C. at the time of its entry into the plenum chamber, is heated by the arc discharge between the anode and the cathode, whereby the temperature is increased into a range of 10,000° to 15,000° C. prior to the gas leaving the expansion nozzle to produce the desired propulsion thrust.

Most of the kinetic energy of the arc that establishes itself upon ignition when propellant flows through the plant, is transferred to the fuel gas in the area of the nozzle neck or constrictor. The arc establishes itself on a path from the anode through the nozzle neck to the tip of the cathode which normally has a conical configuration. This path of the arc extends precisely along the central axis of the constrictor or nozzle neck.

Thermal arcjet propulsion plants using ammonia as propellant have been constructed for substantially all power classes. These plants using ammonia have the advantage of a relatively simple handling without any problems compared to plants using hydrazin. However, ammonia using plants have a smaller specific thrust than hydrazin using plants.

OBJECTS OF THE INVENTION

In view of the above it is the aim of the invention to achieve the following objects singly or in combination:

to improve a thermal arcjet propulsion plant in such a way that it has a higher efficiency and efficacy;

to construct a propulsion plant of the type mentioned in such a way that a substantially higher efficiency is achieved compared to ammonia vapor fuel operated plants while maintaining the combustion and pressure in the plenum chamber the same as in ammonia operated plants;

to use an efficiently operating catalyzer or catalyst for the decomposition of ammonia into nitrogen and hydrogen; and to substantially increase the specific propulsion thrust generated by such arcjet propulsion plants.

SUMMARY OF THE INVENTION

The arcjet propulsion plant according to the invention comprises a plenum chamber and a device for the catalytic and/or thermal decomposition of the injected propellant, whereby the decomposition device is arranged in series with and upstream of the plenum chamber as viewed in the direction of the propellant to the plenum chamber.

According to the invention, the ammonia is practically completely decomposed catalytically and per thermally into hydrogen ($H_2$) and nitrogen ($N_2$) prior to the entry of the gases into the plenum chamber and the decomposition or dissociation is accomplished by a catalyzer. The exit velocity of the decomposed propellant is substantially higher than that of the ammonia vapor while the temperature and the pressure in the plenum chamber remain the same.

It has been found that the decomposition or dissociation of the ammonia is efficiently accomplished by catalysts that are also suitable in hydrazin propulsion plants, namely especially platinum, iridium, palladium, and ruthenium catalysts. These catalysts or catalyzers can be used in the form of a granular material, or in the form of a very fine screen, or in the form of small solid spheres made of these materials. It is, however, important in each instance that the surface area of the catalyst material exposed to the propellant flow is as large as possible.

In order to achieve a high decomposition rate or dissociation rate of the ammonia prior to its injection into the plenum chamber, a preferred embodiment of the invention provides for heating of the decomposition chamber where the catalysts are located. However, in plants requiring a smaller propellant flow rate or throughput it may be sufficient in another advantageous embodiment of the invention to construct the dissociation chamber as a tubular catalyzer through which the ammonia is caused to flow for its decomposition. Preferably, the tubular catalyzer is arranged to helically surround the plenum chamber in the propulsion plant housing.

The plant according to the invention is primarily suitable for using ammonia as propellant. However, the plant is so constructed that it may also be operated by using nitrogen ($N_2$), argon (Ar), hydrogen ($H_2$), and other propellant. Where the present plant is using the just mentioned propellants, the power output can be increased by preheating the propellants prior to their injection into the plenum chamber, whereby an increase in the specific thrust or impulse is achieved.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
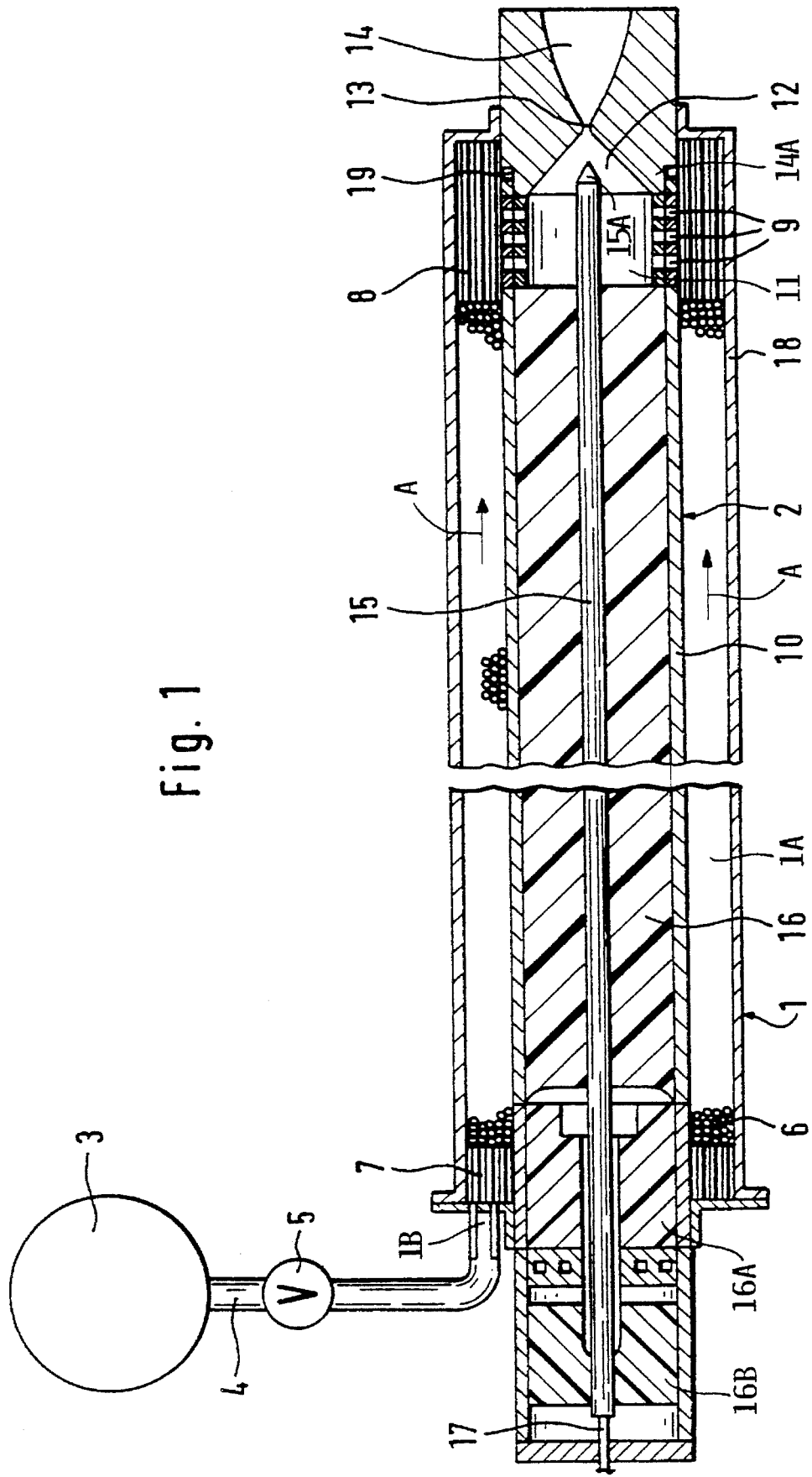
FIG. 1 is a longitudinal sectional view through a thermal arcjet propulsion plant according to the invention in which the catalyzing chamber is arranged concentrically around the plenum chamber.

FIG. 1 shows an arcjet propulsion plant of the type used for the orbit and positional control of space flight bodies. The plant comprises a housing 1 made of platinum that encloses a decomposition or dissociation chamber 1A surrounding an inner housing 10 made of platinum in which the cathode 15 is concentrically mounted by electrically insulating components 16, 16A and 16B. Ammonia in a propellant tank 3 is supplied through a pipe 4 and a valve 5 into the inlet 1B of the decomposition chamber 1A, wherein the ammonia gas is dissociated into its gaseous components by a catalyst. The gas components flow as indicated by the arrows A from the inlet 1B through the through-bores 9 forming flow paths through the inner housing 10 to enter into the plenum chamber 12. On their way, the gases pass through a catalytic screen cylinder 7, through a catalyst 6, and through a further catalytic screen cylinder 8.

As shown in FIG. 1, the housing 1 and thus the decomposition chamber 1A is a cylindrical structure and the housing 10 of the arcjet plant 2 is concentrically arranged inside the housing 1 which is mounted on the housing 10 so that the wall of the housing 10 is simultaneously the radially inner wall of the decomposition chamber 1A. The catalyst 6 is for example, provided in the form of aluminum oxide ceramic material ($Al_2O_3$) spheres doped with iridium. The individual spheres are held in place in the chamber 1A by the above mentioned screen cylinders 7 and 8. Further, the screen cylinder 7 positioned at the inlet 1B makes sure that the ammonia entering the decomposition chamber 1A is uniformly distributed over the cross-sectional area of the inlet end of the chamber 1A. Thus, the individual spheres or balls 6 are uniformly exposed to the incoming ammonia. The dissociated gas components pass through the exit screen cylinder 8 and the holes 9 into a gas collection chamber 11 open into the plenum chamber 12 enclosed between the housing 10 and the propulsion nozzle 14 of the plant 2.

The plant 2 comprises in addition to the housing 10 of rotational symmetry the above mentioned collection chamber 11 and the plenum chamber 12 as well as a nozzle neck or constrictor 13 followed by the expansion section of the nozzle 14.

The cathode 15 having a conical tip 15A is arranged coaxially and concentrically in the housing 10 held in place by the insulating insert 16 made of boron nitride and further insulating components 16A and 16B made of boron nitride. The cathode is connected to an electric power supply by an insulated electrical conductor 17. The housing 10 forming the anode is connected respectively to the power supply by a connection not shown. The cathode 15 is connected to the negative terminal and the housing 10 as the anode is connected to the positive terminal of the electrical power supply. As shown, all components, especially the housings 1 and 10 and the cathode 15 have a common central axis and the arrangement of the cathode 15 with the constrictor 13 and the nozzle 14 made of tungsten is referred to as an in-line arrangement.

For compensating large thermal expansions due to the different temperatures to which the individual components are exposed, the expansion nozzle 14 is only connected with the outer jacket 18 of the housing 1. A loose sliding fit is provided between an axially inner end 14A of the nozzle 14 and the right-hand end of the housing 10. In fact, a small air gap 19 may be provided at this point to compensate for different thermal expansions to avoid the danger of mechanical damage.

Figure 2:
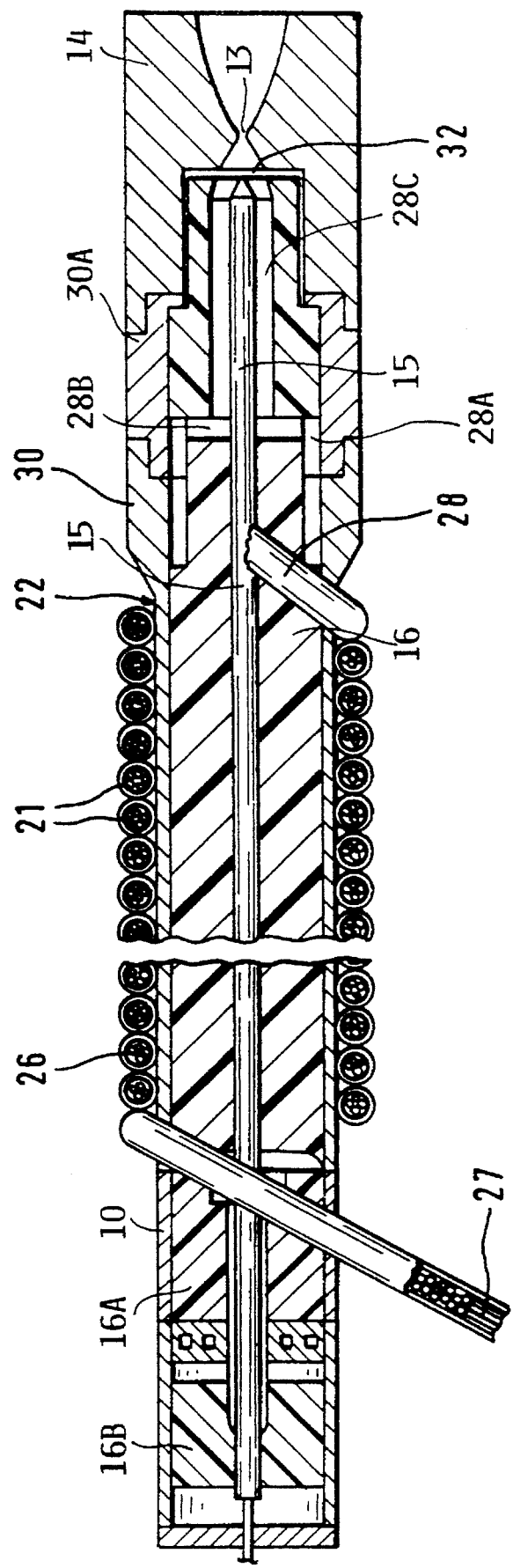
FIG. 2 shows an axial sectional view similar to that of FIG. 1, however, with the catalyzer chamber or dissociation chamber in the form of a tube arranged helically around the housing of the plant.

FIG. 2 shows an embodiment in which the decomposition chamber is formed by a helically wound pipe 21 made of platinum and mounted to surround the second housing 10 forming the anode. The housing 10 has an extension 30 to which the nozzle 14 is connected by an intermediate piece 30A constructed to provide compensation for temperature expansions and contractions. The helical decomposition or dissociation chamber 21 is connected to the housing 10, for example, by soldering or the like. The chamber formed by the platinum pipe 21 is filled with spheres 26 made of iridium functioning as a catalyst. These spheres 26 are held in place in the helical pipe 21 by end screen cylinders 27 and 28. The spheres 26 are filling the pipe 21 with a uniform distribution of the spheres throughout the pipe. This uniform distribution of the spheres 26 is achieved by vibrating the pipe during filling prior to coiling and securing the pipe 21 to the housing 10 and then soldering the pipe to the housing 10. The gas components coming out of the screen cylinder 28 flows through ducts 28A, 28B and 28C forming flow paths into the plenum chamber 32.

The construction shown in FIG. 2 is especially suitable for arcjet propulsion plants designed for small thrust power approximately below 10 kW and a respectively small throughput or consumption of fuel gas. Due to the thermal contact between the pipe 21 and the housing section 10, heat generated in the plenum chamber 32 is transmitted to the pipe 21 where the heat accelerates the dissociation of the ammonia flowing through the catalyzer bed of the spheres 26 of iridium, for example. The spheres 26 due to their random orientation within the volume of the pipe 21 cause a turbulent gas flow which increases the surface area contact between the flow gas and the spheres.

Figure 3:
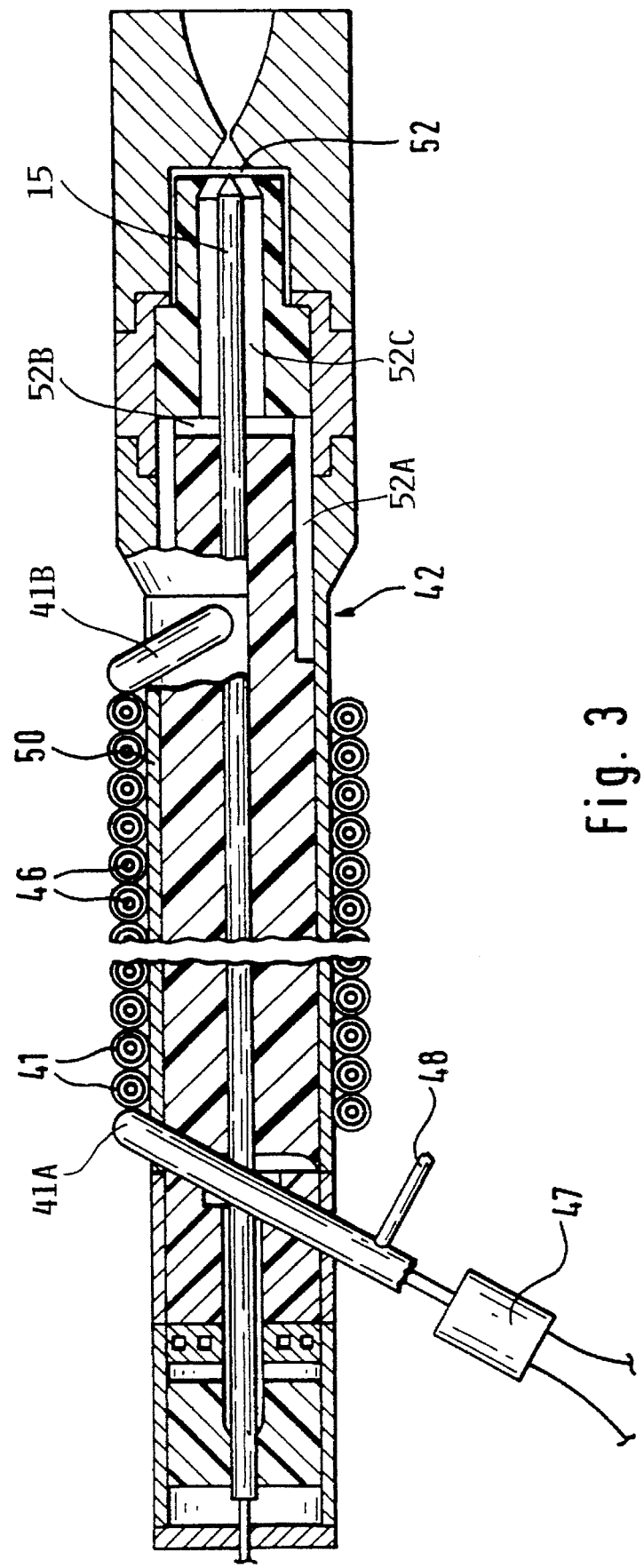
FIG. 3 is a longitudinal sectional view similar to that of FIG. 2, however, with a heater arranged in the helically wound tube forming the decomposition chamber.

FIG. 3 illustrates an embodiment similar to that of FIG. 2, however, constructed so that the arcjet propulsion plant 42 is also capable of using instead of ammonia as a propellant such as hydrogen, nitrogen, argon or the like. The plant 42 differs from that shown in FIG. 2 in that a heating conductor 46 is centrally positioned in the coiled-up pipe 41 forming the dissociation chamber wound as a helix around and mounted on the housing 50. The conductor 46 is connected to a heating element or source of power 47. Initially, the pipe 41 is straight and the heater conductor 46 is inserted into the straight pipe, whereupon the pipe and conductor are formed into a helix around the housing 50 of the plant 42. At least the end portions 41A, 41B of the pipe 41 are thermally connected to the housing by soldering or the like. The propellant is introduced through a pipe inlet or nipple 48 feeding into the pipe 41. The temperature increase inside the pipe 41 may reach 1200° C. before the propellant is discharged into the plenum chamber 52 through flow paths or passageways 52A, 52B, and 52C. Due to this preheating of the propellant a significantly higher thermal efficiency is achieved even when gases are used that do not dissociate. As a result, a larger specific thrust or impulse of the plant 42 can be achieved.

Although the invention has been described with reference to specific example embodiments, it will be appreciated that it is intended to cover all modifications and equivalents within the scope of the appended claims.

What is claimed is:

1. An arcjet propulsion plant for a space flying body, comprising a housing including an anode and an expansion nozzle forming a restrictor, a cathode concentrically mounted and electrically insulated in said housing for igniting an arc between a tip of said cathode and said anode when a propellant flow exists, a recess forming a plenum chamber (32, 52) in said anode housing upstream of said nozzle, said cathode tip reaching into said plenum chamber, an air gap spacing said cathode tip from said restrictor of said expansion nozzle, a propellant dissociation device (21, 41) mounted to directly surround said housing, and flow paths connecting said dissociation device in series with said plenum chamber for introducing dissociated propellant into said plenum chamber through said flow paths, and wherein said dissociation device is formed as a tubular member (21, 41) forming a decomposition chamber that is wound into a helix surrounding said housing, said flow paths having at least a radial portion (28B, 52B) leading from an end of said helix to said cathode (15).

2. The arcjet of claim 1, wherein said decomposition chamber formed by said tubular member is filled with a catalyst (26).

3. The arcjet of claim 2, wherein said catalyst comprises spheres of an aluminum oxide ceramic ($Al_2O_3$) doped with iridium.

4. The arcjet of claim 1, further comprising a heating device (46) extending inside said tubular member (41) forming said dissociation chamber.

5. The arcjet of claim 1, wherein propellant entering into said dissociation device is ammonia.

* * * * *